United States Patent
Hirokou et al.

[11] Patent Number: 5,871,861
[45] Date of Patent: Feb. 16, 1999

[54] LITHIUM ION SECONDARY CELL

[75] Inventors: Nobuyoshi Hirokou; Yuukichi Kobayashi, both of Tokyo; Isao Kaneko, Joetsu; Minoru Inoue, Joetsu; Tomikazu Koyama, Joetsu, all of Japan

[73] Assignee: Mitsubishi Chemical Corporation, Tokyo, Japan

[21] Appl. No.: 727,203

[22] Filed: Oct. 8, 1996

[51] Int. Cl.⁶ .................................................. H01M 2/26
[52] U.S. Cl. .......................... 429/149; 429/161; 429/4; 429/62; 429/211
[58] Field of Search .................................. 429/149, 151, 429/161, 160, 211, 4, 62

[56] References Cited

U.S. PATENT DOCUMENTS

| | | | |
|---|---|---|---|
| 4,734,342 | 3/1988 | Seiger | 429/152 |
| 5,227,267 | 7/1993 | Goebel et al. | 429/161 |
| 5,397,659 | 3/1995 | Jmhof et al. | 429/161 |
| 5,401,595 | 3/1995 | Kagawa et al. | 429/152 |
| 5,415,954 | 5/1995 | Gauthier et al. | 429/211 X |
| 5,487,958 | 1/1996 | Tura | 429/151 |

*Primary Examiner*—Anthony Skapars
*Attorney, Agent, or Firm*—Nims, Howes, Collison, Hansen & Lackert

[57] ABSTRACT

A lithium ion secondary cell comprises a plurality of single cells composed of a collector comprising positive electrodes composed of a metallic material coated with a positive electrode active substance; negative electrodes composed of a metallic material coated with a negative electrode active substance; separators interposed between the positive and negative electrodes; lugs of the metallic materials where the active substance is not coated; and conductors adapted to bunch and clamp the lugs of the positive and negative electrodes separately, the positive and negative electrodes being assembled in laminate alternatively, and the ends of the lugs of the positive and negative electrodes being welded to the respective conductors separately so that electric current can be taken out through the conductors.

14 Claims, 10 Drawing Sheets

LITHIUM ION SECONDARY CELL

BACKGROUND OF THE INVENTION

The present invention relates to a lithium ion secondary cell, and more particularly, to a lithium ion secondary cell having a large capacity and high energy density and capable of application in fields where there is high demand for maintenance-free properties of the products or system, such as in the manufacture of electric automobiles, load leveling of electric power, etc.

To meet the need for miniaturization and light-weight of electronic devices in recent years, there have been developed as a power source, lightweight, miniaturized lithium ion secondary cells and these have been practically used in certain electronic devices such as handheld video cameras, portable personal computers and the like. However, the maximum capacity of these lithium ion secondary cells in practical use is around 5–20 Wh and these are mostly cylindrical in shape.

On the other hand, because of the increasing demand for protecting the environment and saving resources, there has been increasing interest shown in electric automobiles, and also in the need to use load leveling of electric power for effective utilization of nighttime power supply. These demands require the development of large-capacity and low-cost maintenance-free secondary cells.

The lead accumulators widely used in these fields at present are low in output of energy and also inconvenient for use because of heavy weight. Also, these lead accumulators involve the problems relating to maintenance such as the necessity of water replenishment, and their charge-discharge cycle life is as short as about 600 cycles, resulting in a high cost for these batteries. Nickel-cadmium batteries are also used, but their use is limited as the nickel-cadmium batteries are low in energy density, and high in manufacturing cost compared with lead accumulators.

Other types of batteries such as nickel-zinc batteries and sodium-sulfur batteries have been experimentally used for electric automobiles, but they involve their own problems such as short charge-discharge cycle life (nickel-zinc battery) and high possibility of causing dangerous conditions (sodium-sulfur battery).

A Lithium ion secondary cell is suited for these applications because of its high energy density and its structural features of being a closed type and maintenance-free, but none with a large capacity has ever been commercially produced. For application to these uses for electric automobiles, the battery is required to have a capacity on the order of 1,000–5,000 Wh, which is more than 100 times the capacity now available.

The lithium ion secondary cells in practical use are mostly of the cylindrical type, but those with a large capacity of the order of 1,000 to 5,000 Wh required for electric automobiles, load leveling, etc., must be square-type cells comprising an assembled cell of two or more of series-connected 3–4 V single cells of a structure in which positive electrodes comprising metal foils coated with an active substance and negative electrodes comprising metal foils coated with an active substance are stacked alternately by means of a separator interposed therebetween. Such square type lithium ion secondary cells have not yet been put to practical use, nor are there such cells commercially available with a large size, and high toughness, vibration resistance and impact resistance sufficient for application to electric automobiles.

For use of lithium ion secondary cells as the large-capacity batteries applicable to electric automobiles or load leveling of electric power, it is necessary first of all to enlarge their electric capacity.

The lithium ion second batteries used for such purposes are usually designed to be a square-type cell comprising an assembled cell of series-connected single cells each of which consists of several ten to about 100 electrodes associated in laminate so that the positive electrode and the negative electrode are arranged alternately by means of the separator interposed therebetween.

Especially, in application to electric automobiles, the said batteries are required to be enlarged in size and to have high toughness, vibration resistance and impact resistance. This requires the electrodes themselves to have long charge-discharge cycle life as well as high toughness, vibration resistance and impact resistance. Also, the structure of the single cells comprising a stacked assembly of such electrodes needs to be designed to have equally high toughness, vibration resistance and impact resistance.

It is demanded to enlarge the size of the lithium ion secondary cells and to enhance toughness as well as vibration resistance and impact resistance of the lithium ion secondary cells.

In case of the enlargement of a lithium ion secondary cell, such lithium ion secondary cell involves a problem that the heat generated in the inside of the cell during charge and discharge tends to accumulate in the battery, thereby causing a rise of internal temperature of the cell, even above the permissible level. So, there needs to be a release of such heat to the outside of the cell. A need for a secondary cell which can endure rapid charge and discharge is especially high in application to electric automobiles. The conventional lithium ion secondary cells have the problem that heat is accumulated in the inside of the cell as rapid cycles of charge and discharge are repeated, causing a rise of internal temperature of the cell above the allowable level.

As a result of the present inventors' earnest studies for solving the above problems, it has been found that:

(I) a lithium ion secondary cell comprising a single cell comprising positive electrodes composed of a metallic material (metal sheet) coated with a positive electrode active substance and negative electrodes composed of a metallic material (metal sheet) coated with a negative electrode active substance are stacked alternately by means of separators interposed therebetween, the lugs of the metallic materials of the respective electrodes being electrically connected to the respective conductors separately, thereby forming a collector, (i) wherein the lugs of the metallic materials of the positive and negative electrodes are respectively bunched together and clamped with the conductors, the edges of the said lugs of the electrodes and the said conductors are welded to form the collector so that electric current can be taken out through the said conductors, or (ii) wherein conductive spacers for keeping the distance between the electrodes constant are disposed between the lugs of the metallic materials of the respective electrodes in the interval of the positive or negative electrode substance and the welded portion and secured in position for electrically connecting the electrodes of each single cell separately to form the collector so that electric current can be taken out through the said spacers; or (II) a lithium ion secondary cell comprising an assembled cell composed of two or more of series-connected single cells in each of which positive electrodes composed of a metallic material (metal sheet) coated with a positive electrode active substance and negative electrodes composed of a metallic material coated with a negative electrode active substance are stacked alternatively by mean of separators interposed therebetween, in which the lugs of the metallic materials of the respective electrodes are electrically connected to the conductors separately, thereby forming a collector, and conductors electrically and thermally connected to the collector are so arranged that at least one conductor per cell for each electrode is extended, directly from each single cell, to the outside of the cell through the wall of its case so that electric current can be taken out through the said conductors while allowing release of the heat accumulated in the cell during charge and discharge to thereby prevent rise of internal temperature of the cell, the lithium ion secondary cells (I) and (II) have high toughness, vibration resistance and impact resistance, and are capable of effectively preventing rise of internal temperature of the cell. On the basis of the finding, the present invention has been attained.

SUMMARY OF THE INVENTION

The object of the present invention is to provide a lithium ion secondary cell which has high toughness as well as high vibration and impact resistance, is capable of effectively preventing rise of temperature in the cell, and can also easily satisfy the request for the large-sized cell.

To accomplish the aim, in a first aspect of the present invention, there is provided a lithium ion secondary cell comprising a plurality of single cells composed of a collector comprising positive electrodes composed of a metallic material (metal sheet) coated with a positive electrode active substance, the negative electrodes composed of a metallic material (metal sheet) coated with a negative electrode active substance, separators disposed between the positive and negative electrodes, lugs of the metallic materials of the positive and negative electrodes where the positive or negative electrode active substance is not coated, and conductors adapted to bunch and clamp the lugs of each of the positive and negative electrodes, the positive and negative electrodes being assembled in laminate and the edges of the lugs of the positive and negative electrodes being welded to the respective conductors independently of each other, whereby electric current can be taken out through the conductors.

In a second aspect of the present invention, there is provided a lithium ion secondary cell comprising a plurality of single cells composed of a collector comprising:

positive electrodes composed of a metallic material (metal sheet) coated with a positive electrode active substance; negative electrodes composed of a metallic material (metal sheet) coated with a negative electrode active substance; separators interposed between said positive and negative electrodes; lugs of said metallic materials where said active substance is not coated; conductors electrically connected to said lugs of the positive and negative electrodes separately; and conductive spacers disposed between said lugs of the positive and negative electrodes separately for maintaining constant the spacing between the positive and negative electrodes, said positive and negative electrodes being assembled in laminate alternately, and the spacers disposed between the lugs of the positive electrodes and the spacers disposed between the lugs of the negative electrodes being respectively secured in position so as to electrically connect the electrodes of the single cells so that electric current may be taken out through said spacers.

In a third aspect of the present invention, there is provided a lithium ion secondary cell comprising an assemble of series-connected two or more single cells each comprising a collector comprising:

positive electrodes composed of a metallic material (metal sheet) coated with a positive electrode active substance; negative electrodes composed of a metallic material (metal sheet) coated with a negative electrode active substance; separators disposed between said positive and negative electrodes; lugs of said metallic materials where said active material is not coated; and conductors connected separately to said lugs of the positive and negative electrodes, the conductors electrically and thermally connected to said collectors being so arranged that at least one conductor per cell for each electrode is extended directly from each cell to the outside of the cell container through the wall thereof so that electric current can be taken out through said conductors while allowing release therethrough of the heat accumulated in the cell during charge and discharge, thereby preventing a rise in temperature in the cell.

DETAILED DESCRIPTION OF THE INVENTION

Figure 1:
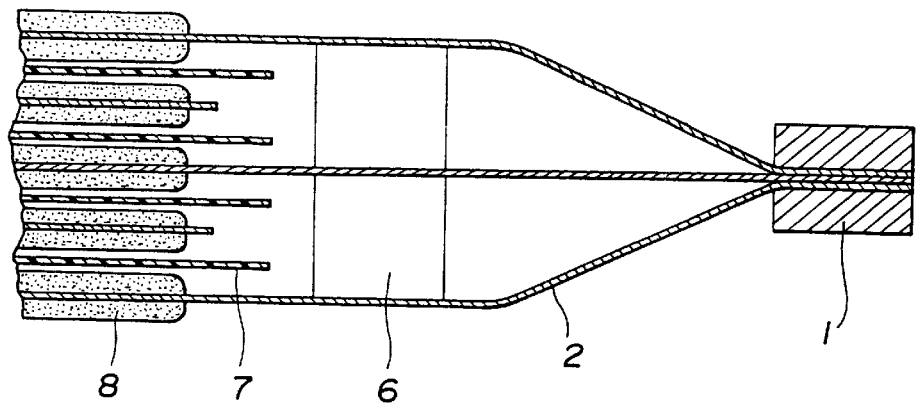
FIG. 1 is a cross-sectional view showing a situation before welding of a metal foil (metallic material) and a metal piece (conductor) in a cell element of the present invention.

The lithium ion secondary cell according to the present invention comprises essentially negative electrodes, positive electrodes, separators and a non-aqueous electrolyte. As a negative electrode active substance, carbonaceous materials which can be intercalated or doped with lithium are used. As a positive electrode active substance, metal oxide-based compounds such as $Li_xCoO_2$, chalcogenite-based compounds such as $Li_xTiS_2$, etc., in which lithium can be occluded or intercalated, are used.

The negative electrode is made by forming a slurry of the negative electrode active substance and a binder (hereinafter referred to as a "negative electrode mixed agent") with a solvent, coating the resulting slurry on a metal foil (metal material) such as copper foil, and drying the formed coat. If necessary, the coated foil may be subjected to rolling treatments.

The positive electrode made by forming a slurry of a positive electrode active substance, a binder and a conductive material (hereinafter referred to as a "positive electrode mixed agent") with a solvent, coating the resulting slurry on a metal foil (metal material) such as aluminum foil, and drying the formed coat. If necessary, the coated foil may be subjected to rolling treatments.

As a separator, there can be used the porous thin films of synthetic resins, for example, 25 $\mu$m thick porous films of polypropylene resins or 10 $\mu$m thick porous films of polyethylene resins.

As a non-aqueous electrolyte, a solution of a lithium salt in an organic solvent is used. The lithium salts usable here are not specified, but they include, for example, $LiPF_6$, $LiBF_4$, $LiClO_4$, $LiAsF_6$, $LiCF_3SO_3$ and the like. The organic solvents usable for preparing the said electrolyte are also not specified, but include, for example, carbonates, ethers, ketones, sulforan-based compounds, lactones, nitrites, chlorinated hydrocarbons, amines, esters, amides, and phosphoric ester-based compounds.

More specifically, as the typical examples of the said solvents, propylene carbonate, ethylene carbonate, vinylene carbonate, tetrahydrofuran, 2-methyltetrahydrofuran, 1,4-dioxane, 4-methyl-2-pentanone, sulforan, 3-methylsulforan, γ-butyrolactone, dimethoxyethane, diethoxyethane, acetonitrile, propionitrile, benzonitrile, butyronitrile, valeronitrile, 1,2-dichloroethane, dimethylformamide, dimethyl sulfoxide, trimethyl phosphate, triethyl phosphate and mixtures thereof may be exemplified.

As binder for the negative and positive electrodes, there can be used, for example, polyvinylidene fluoride, polytetrafluoroethylene EPDM (ethylene-propylene-diene terpolymer), SBR (styrene-butadiene rubber), NBR (acrylonitrile-butadiene rubber), fluorine rubber and the like. The binders usable in the present invention are, however, not limited thereto.

As a positive electrode conductive material, fine graphite particles, fine particles of amorphous carbons such as carbon blacks (acetylene black, etc.), needle coke, etc., can be used.

As solvent for forming a slurry of the negative electrode mixed agent and positive electrode mixed agent, usually the organic solvents capable of dissolving the binders are used. Such organic solvents include, but are not limited to, N-methylpyrrolidone, dimethylformamide, dimethylacetamide, methyl ethyl ketone, cyclohexanone, methyl acetate, methyl acrylate, dimethyltriamine, N,N-dimethylaminopropylamine, ethylene oxide and tetrahydrofuran.

The negative electrode mixed agent and positive electrode mixed agent may be slurried with a solution prepared by adding a dispersant, a thickener or the like in water, or the electrode active substance may be slurred with a latex such as SBR, the slurry being coated on a metal foil to obtain an electrode.

The negative electrode active substance is a carbonaceous material which can be intercalated or doped with lithium, which such carbonaceous material is not specified, but includes coal coke, petroleum coke, carbide of coal pitch, carbide of petroleum pitch, needle coke, pitch coke, carbide of phenol resin-crystalline cellulose or partially graphitized carbonaceous materials thereof, graphite, furnace black, acetylene black, or pitch-based carbon fiber.

The positive electrode active substance is selected from metal oxide-based compounds, chalcogenite-based compounds and the like, in which lithium can be occluded or intercalated. This material is not specified, but includes, for instance, $Li_xCoO_2$, $Li_xMn_2O_2$, $Li_xMnO_4$, $Li_xV_2O_5$, $Li_xTiS_2$, etc.

As the negative electrode collector material, copper, nickel, stainless steel, nickel-plated steel and the like can be used. As the positive electrode collector material, aluminum, stainless steel, nickel-plated steel and the like can be used. However, of course, the collector materials are not limited to those mentioned above.

The lithium ion secondary cell according to the present invention comprises a single cell of a structure in which the positive electrode metallic material (metal sheet) coated with a positive electrode mixed agent and the negative electrode metallic material (metal sheet) coated with a negative electrode mixed agent are stacked alternately by means of separators interposed therebetween.

The number of the layers may be properly determined depending on the purpose of use of the produced cell, but in order to make the cell larger, it needs to stack ten-odd, in some cases as many as about 100 electrodes.

As the metallic material on which the positive electrode mixed agent or negative electrode mixed agent is to be coated, a thin metal sheet such as metallic foil, metallic plate, porous metallic plate, metal gauze or the like is preferably used.

In the present invention, the lugs of the metallic materials where the positive electrode mixed agent or negative electrode mixed agent is not applied, are electrically and thermally connected to the respective conductors, separating the positive electrode and the negative electrode, to form a collector.

The "conductor" referred to herein usually means a bar-like metal piece, but it includes metal bars having radiating fins, the metal fittings designed so as to connect the single cells, and when the occasion demands, the properly worked carbon articles.

Thus, in a first embodiment of the present invention, the lugs of the metal sheets where the positive electrode mixed agent or negative electrode mixed agent has not been applied, are electrically connected to the respective conductors separately for the positive electrode and negative electrode to form a collector, the plural numbers of the lugs of the positive electrode and negative electrode being respectively bunched together and clipped by the conductors, the conductors being welded to the edges of the said electrode lugs to form a collector so that electric current can be taken out through the conductors. More preferably, the conductors electrically and thermally connected to the collector are so arranged that at least one conductor per cell for each of the positive electrode and negative electrode is extended out directly from each cell, to the outside of the cell inner container through the wall (top cover) thereof so that through the conductors electric current can be taken out, allowing release of the heat accumulated in the cell during charge and discharge.

In forming the collector, it is preferred that each metallic material having the electrode active substance is directly welded to a conductor such as a metal piece for taking out electric current and heat from the metallic material. These metallic materials and metal pieces can be electrically and thermally connected by binding into bundles the edges of the lugs of the metallic materials of each of the positive and negative electrodes, clamping respectively the edges for the positive electrode and negative electrode by two metal pieces (conductors) and welding respectively the edges of the lug of the positive electrode and negative electrode and the two metal pieces (conductors) from the side of the lug end.

As for the welding method, TIG (tungsten-inert gas) welding, high-frequency welding or ultrasonic welding is preferably used.

Figure 2:
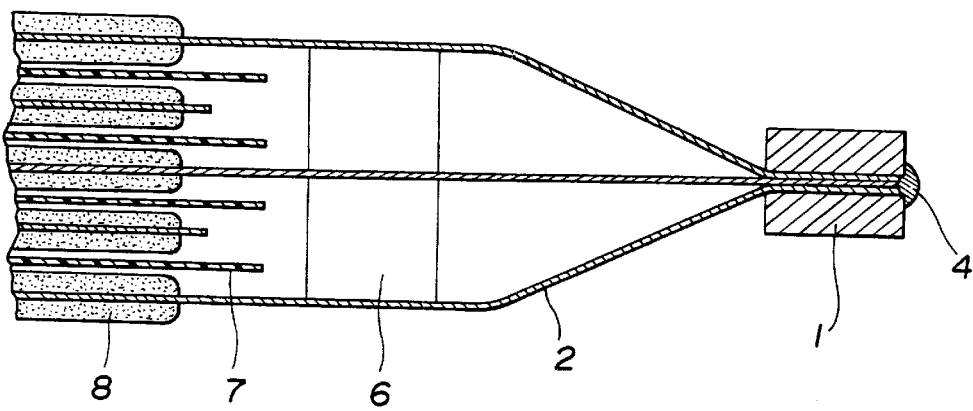
FIG. 2(a) is a cross-sectional view taken along the section 2A—2A of FIG. 2(b) a side view FIG. 2b being showing a situation after welding in the cell element of FIG. 1.
Figure 2:
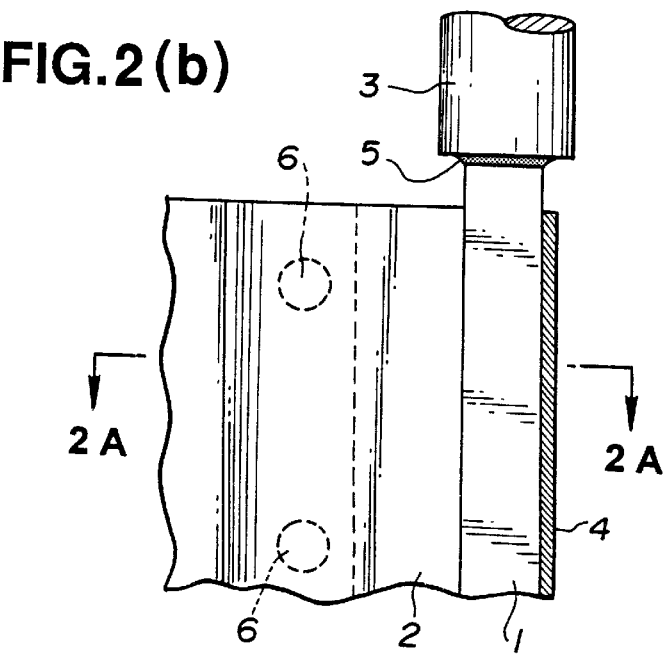

For carrying out welding, as illustrated in FIG. 1, the ends of the bunched lugs of the electrodes are sandwiched between a pair of metal pieces (conductors) 1, and then, as illustrated in FIG. 2, the clamped lug ends and the metal pieces (conductors) 1 are welded together from the side of the lug end.

FIG. 1, FIG. 2(a) and FIG. 2(b) show the situations before and after welding of the clamped lug ends and the two metal pieces. In these figures, numeral 2 denotes metallic materials, 3 terminal metal piece, 4 weld metal zone, 5 weld between terminal metal 3 and metal piece (conductor) 1, 6 non-conductive spacers, 7 separators, and 8 layers of electrode active substance.

Figure 3A:
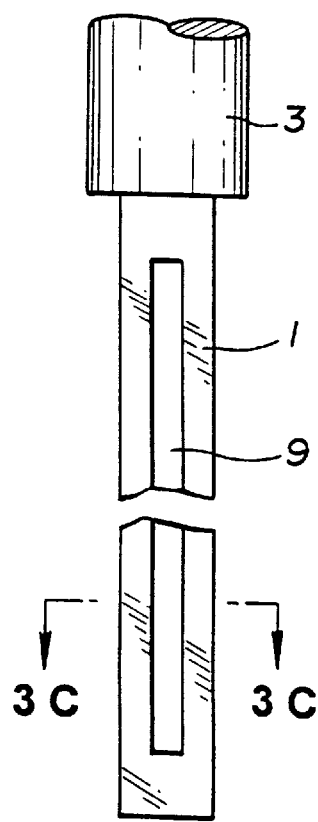
FIG. 3(a), FIG. 3(b) and FIG. 3(c) are a front view, a side view and a cross-sectional view taken along the section 3C—3C of FIG. 3(a), respectively, showing a slit metal piece used as the conductor for welding with a metal foil.
Figure 3B:
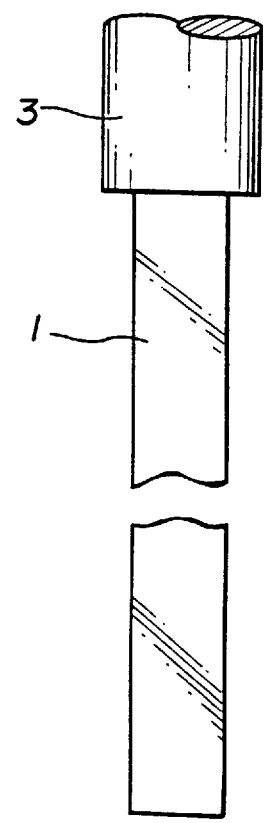
Figure 3C:
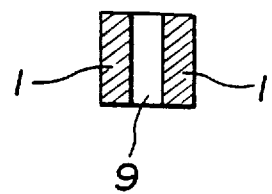
Figure 4:
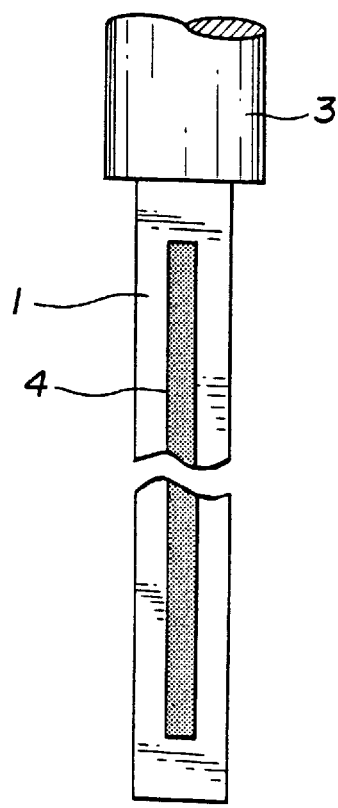
FIG. 4(a), FIG. 4(b) and FIG. 4(c) are a front view, a side view and a cross-sectional view taken along the section 4C—4C of FIG. 4(b), respectively showing a situation after welding in the cell element of FIG. 3.
Figure 4:
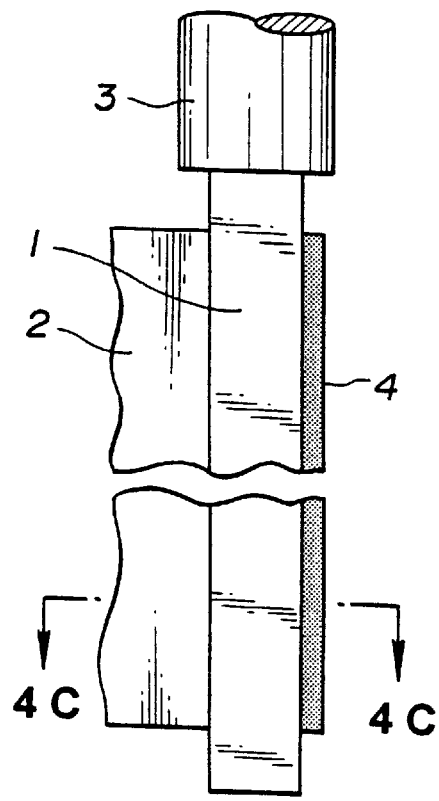
Figure 4:
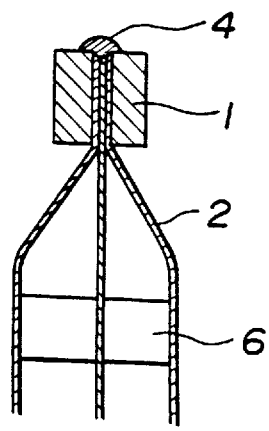

The two metal pieces (conductors) may be of any shape as far as it is suited for inserting therebetween the ends of the bunched lugs of the electrodes from both sides thereof and welding the edges of the clamped lugs and the two metal pieces (conductors). For instance, as illustrated in FIG. 3(a) to FIG. 3(c) a slit 9 may be formed in a metal piece 1 joined integral with the terminal metal 3, and as illustrated in FIG. 4(a) to FIG. 4(c), the ends of the bunched lugs of the electrodes are passed through the slit and the slit portion is welded to the edges of the lugs and the metal piece from the lug end side.

FIG. 3(a) to FIG. 3(c) and FIG. 4(a) to FIG. 4(c) show the situations before and after welding in case of using a slit metal piece.

In the present invention, 3 to 30, preferably 5 to 10 lugs of the metallic materials of each of the positive and negative electrodes are bunched and clamped between a pair of metal pieces, and the edges of the clamped lugs of the electrodes and the two metal pieces are welded from the edge side to form a collector. In the single cell of the multilayer structure of separator-positive electrode-separator-negative electrode combination, the negative electrode-negative electrode spacing is usually a little less than 1 mm to around 1.5 mm, and the positive electrode-positive electrode spacing is usually a little less than 1 mm to around 1.5 mm, so that when 5 to 10 lugs are bunched together, the overall layer thickness of each electrode becomes 5 to 15 mm. Therefore, when the overall layer thickness of a single cell is about 40 mm, the collector is constituted by about 4 sets of metal piece for the positive and negative electrodes in this single cell.

In the present invention, in order to strengthen the single cell structure, it is preferred that in the single cell constituted by the positive and negative electrodes assembled alternately, non-conductive spacers are respectively disposed therebetween for maintaining respectively constant the spacing between the positive electrodes and the spacing between the negative electrodes, and the electrode layers of the cell are clamped from the outside by a non-conductive frame. Such structure of the single cell contributes to enhancing the toughness as well as vibration and impact resistance of the cell.

The non-conductive frame may be made of a synthetic resin such as polypropylene or a metal with the surface thereof to be insulated being coated with a non-conductive material.

When inserting the spacers between the electrodes, it is recommended to employ the following the methods for the reason of high productivity.

i) The spacers are previously adhered with an adhesive to the lugs of the metal foils of the positive and negative electrodes.

In this case, by assembling the cell elements in the order of positive electrode-separator-negative electrode-separator-positive electrode, there can be obtained a single cell in which the spacers have already been incorporated. Thus, since the step of inserting the spacers is unnecessary, the productivity of the lithium ion secondary cell manufacturing process is markedly enhanced.

ii) There are used long and narrow spacers matching the longitudinal length of the lugs of the electrodes.

By use of such spacers, the frequency of the troublesome small spacer inserting operations can be lessened, resulting in an enhanced productivity of the lithium ion secondary cell.

According to a second embodiment of the present invention, the lugs of the metallic materials of the positive and negative electrodes are separately secured with the conductive spacers having a good heat transferability for the respective positive and negative electrodes, thereby forming a collector by which electric current and heat can be taken out through the spacers. More preferably, the conductors electrically and thermally connected to the collector are so arranged that at least one conductor per cell for each of the positive electrode and the negative electrode is extended out, directly from each cell, to the outside of the cell through the wall (top cover) of the cell case so that electric current may be taken out through the conductors while allowing release therethrough of the heat accumulated in the cell during charge and discharge.

Thus, in a square-type lithium ion secondary cell comprising an assembled cell composed of two or more series-connected single cells in which the positive electrodes made of a metallic material coated with a positive electrode mixed agent and the negative electrodes made of a metallic material coated with a negative electrode mixed agent are assembled alternately by means of separators interposed therebetween, it is necessary for enlarging the size of the cell to combine ten-odd to about 100 electrodes to form a multilayer structure. For enhancing toughness, vibration resistance and impact resistance of the single cell structure in such a multilayered cell, it is expedient to mechanically secure the electrodes the spacers interposed therebetween. Various methods are available for performing such mechanical fastening. For instance, holes are formed in the spacers and the metal foils of the electrodes in alignment, and the bolts or threaded metal bars are passed through the holes and tightened with nuts. It is also effective to use a clamping metal means capable of clamping the metallic materials of the electrodes of each single cell by metal fittings and to clamp the metallic materials of the electrodes from the outside.

For performing effective clamping of the metallic materials of the electrodes to assemble the single cells with high toughness and high vibration and impact resistances, the positive and negative electrodes of each cell are designed so as to have such dimensions that allow the lugs of the metal foils to rest on the corresponding spacers. By clamping the bunches of the lugs of the metallic materials in this manner, it is possible to obtain the single cells with high toughness as well as high vibration and impact resistances.

In the end of the negative electrode in the above mechanism, a non-conductive spacer is disposed between the lug of the negative electrode and the corresponding lug of the positive electrode while a non-conductive washer is placed between the end of the negative electrode and the clamping bolt of the positive electrode, thereby electrically separating the positive and negative electrodes. Similarly, the positive and negative electrodes are electrically separated at the end of the positive electrode. It is possible to use here an integrated part of a non-conductive spacer and a non-conductive washer.

Electrical separation of the positive and negative electrodes can be performed in other ways as well. For instance, in the case of the clamping means for the positive electrodes, the non-conductive spacers are disposed between the positive and negative electrodes at the ends of the negative electrodes and the lugs of the positive electrodes, and the parts where the end of the negative electrode and their clamping means are contacted, have been worked to be non-conductive. Similar method can be applied for electrical separation in the case of the end of the positive electrode and their clamping means.

For taking out electric current and heat from the single cells, it is imperative to make effective and firm connection between the collectors of the electrodes, namely the metallic materials such as metal foil, metal plate, porous metal plate, metal gauze, etc., contacted with the electrode active substance and the terminals of the positive and negative electrodes of the cell assembly. It is preferred to electrically and thermally as well as effectively and strongly connect the metallic materials such as metal foils and the conductors such as metal pieces. The following methods are available for this purpose.

1) At least one piece of the metallic materials such as metal foils of the positive and negative electrodes (preferably the electrodes at both ends of the single cell) forming the collector of the single cell is designed to have a thickness of greater than 100 $\mu$m, and a conductive metal piece is welded thereto to allow release of electric current and heat through this metal piece. By making the thickness of the said metallic material greater than 100 $\mu$m, it becomes possible to weld the metallic materials to a conductive material such as metal piece by known methods such as high frequency welding, TIG welding, etc.

2) The conductors such as metal pieces are electrically and thermally connected, by welding or other methods, to the clamping metals of the spacers which are electrically and thermally connected to the metal elements of the collector of the single cell.

As the clamping metal means of the spacer, there can be used a bolt-and-nut type fastening device, clamp or other means by which the electrode layers of the single cells are secured or clamped in the state of being held from the outside. Various methods may be used for electrically and thermally connecting the conductors such as metal pieces to the clamping metal means, for example, the conductors are welded to the clamping metal means; the clamping metal means and conductors are worked as integral units; the conductors are secured by bolts and nuts.

3) Metal pieces are directly welded to the spacers which are electrically and thermally connected to the metallic materials of the collector.

In the present invention, the following techniques are preferably used for disposing the conductive spacers between the electrodes for enhancing productivity.

(a) The conductive spacers are adhered with an adhesive to the lugs of the metallic materials such as metal foils of the positive electrode and negative electrodes.

In this case, by assembling the cell elements in the order of positive electrode-separator-negative electrode-separator-positive electrode, there can be obtained a single cell in which the spacers have already been incorporated. As the work for inserting the spacers can be saved, the productivity of the cell manufacturing process is markedly enhanced.

(b) There are used the long and narrow conductive spacers matching the longitudinal length of the lugs of the electrodes.

By use of such long and narrow spacers, a frequency of the small spacer inserting operations is reduced, resulting in an enhanced workability.

(c) In the case of bolt-and-nut type securing, when assembling the positive electrodes, the negative electrodes and the separators for forming a single cell, the conductive spacers are secured in position on the lugs of the positive and negative electrodes, separately for the respective poles. Then the holes are formed in the lugs of the positive electrodes and the corresponding parts of the conductive spacers, and the bolts or threaded metal bars are passed through the holes and tightened with nuts. The same securing method is conducted in the negative electrodes and the corresponding parts of the conductive spacers.

The above methods can dispense with the troublesome works for assembling the single cells by fitting the bolts or threade d metal bars in the openings in the lugs of the electrodes and the conductive spacers, so that the productivity of the lithium ion secondary cell manufacturing process is markedly improved.

In the third embodiment of the present invention, the conductors electrically and thermally connected to the collector are so arranged that at least one conductor per cell for each electrode is extended out, directly from each cell, to the outside of the cell through the wall (top cover) of the cell case so that electric current can be taken out through the conductors while allowing release therethrough of the heat accumulated in the cell during charge and discharge, thereby preventing rise of temperature in the cell.

Thus, it is an object of the present invention to provide a cell structure in which the heat as well as the electric current generated by the electrode active mixed agents can be taken out through a collector. In this structure, the heat and electric current generated by the electrode active mixed agents are transferred to the metallic materials of the positive and negative electrodes separately and then led out of the inner cell container through the conductors (e. g. well heat-transferable metal pieces or bars) which are electrically and thermally connected to the collector from the lugs of the metallic materials and which taken out, at least one per cell for each electrode, to the outside of the cell container through the wall thereof directly from each cell.

Further, in the present invention, in taking out both electric current and heat in the manner described above for preventing the rise of temperature in the cell, air, water or other appropriate coolant is supplied into the chamber (terminal chamber) housing the terminals of the single cells so that the coolant receives heat from the terminals to remove effectively heat out of the system.

Air, water or other coolant may be supplied forcibly by a blower, pump or like means, but it may also be supplied as a natural convection. The coolant may be circulated by a system provided with a cooler, but in the case of air, it may be taken in from and released back into the atmosphere.

According to the present invention, as described above, there can be obtained a lithium ion secondary cell which is suited for enlargement of capacity.

EXAMPLES

The present invention is further described by the following examples, but these examples are merely intended to be illustrative and not to be construed as limiting the scope of the invention.

Example 1

<Negative electrode>

90 parts of coal needle coke ground to an average particle size of 10 $\mu$m was mixed with a solution (2 wt % conc.) of 10 parts of polyvinylidene fluoride in N-methylpyrrolidone to form a slurry of a negative electrode mixed agent. This slurry was coated on both sides of a 20 $\mu$m thick copper foil, dried to evaporate away the solvent and rolled to make a negative electrode. The negative electrode mixed agent was coated over an area of 12 cm×15 cm to a thickness of 250 $\mu$m on each side. Coating was made in such a manner that there would be left a 20 mm lug on the left side and a 3 mm lug on the right side of the copper foil, with no lug formed at the top and bottom ends of the foil.

The electrode constituting the end portion of the single cell is the one which has been coated on one side alone thereof with the negative electrode mixed agent. This electrode is 300 $\mu$m thick and has 20 mm lugs on both sides.

<Positive electrode>

One mole of lithium carbonate and 2 moles of cobalt carbonate were mixed and ground by a ball mill, and the ground mixture was heated at 850° C. in the air for 5 hours, then again ground by the ball mill and further heated at 850° C. in air for 5 hours. To 90 parts of the resulting mixture was added 5 parts of acetylene black as conductive material, and this obtained mixture was dissolved in a solution (2 wt % conc.) of 5 parts of polyvinylidene fluoride in N-methylpyrrolidone to form a slurry of a positive electrode mixed agent. This slurry was coated on both sides of a 25 $\mu$m thick aluminum foil, dried to evaporate away the solvent and rolled to make a positive electrode. The positive electrode mixed agent was coated over the area of 12 cm×15 cm to a thickness of 250 $\mu$m on each side. Coating was made in such a manner that there would be left a 20 mm lug on the left side and a 3 mm lug on the right side of each aluminum foil but no lug formed at the top and bottom ends of the foil.

The electrode constituting the end portion of the single cell was the one which has been coated on one side alone thereof with the positive electrode mixed agent. This electrode was 300 $\mu$m thick and had 20 mm lugs on both sides.

<Construction of single cell>

The negative and positive electrodes made in the manner described above are assembled in layers alternately with 25 $\mu$m thick porous polypropylene sheets interposed therebetween as separators to construct a single cell. The electrodes at both ends have been coated on one side alone with the electrode mixed agent. On the lugs of the negative electrodes on the left side were disposed the copper-made spacers held between the negative electrodes. Similarly, aluminum-made spacers are disposed on the lugs of the positive electrodes on the right side. The spacers are provided at the three locations in longitudinally inserted manner on both positive and negative electrodes sides and secured in position by bolt-and-nut securing. The portions of the lugs where a spacer is to be disposed should be cleaned before fitting the spacer. In the lugs of the negative electrodes on the left side where are contacted with the lug of the end of the positive electrode, there is applied a non-conductive spacer which can double as a washer to electrically separate the positive and negative electrodes. The bolts used for securing are the ones whose head portion has been worked to be non-conductive. The same arrangement is made where the lugs of the positive electrodes on the right side are contacted with the lug of the end of the negative electrode. In this manner, there is formed a collector electrically connected to the positive and negative electrodes separately, and a single cell for a large-capacity lithium ion secondary cell with high toughness as well as high vibration and impact resistance can be produced.

By combining 26 sets and a half of the electrodes ("half" because the electrodes at both ends are coated on one side alone with the electrode mixed agent) of the above-specified size, it is possible to obtain a single cell having a charge and discharge capacity of about 350 Wh.

As the terminals for taking out electric current from the single cell, the metal pieces are welded facing upwards at two locations at the top of the 300 $\mu$m thick metal foil of the end of each of the positive and negative electrodes, so that they will serve as the terminals of the negative and positive electrodes of the cell.

Figure 5:
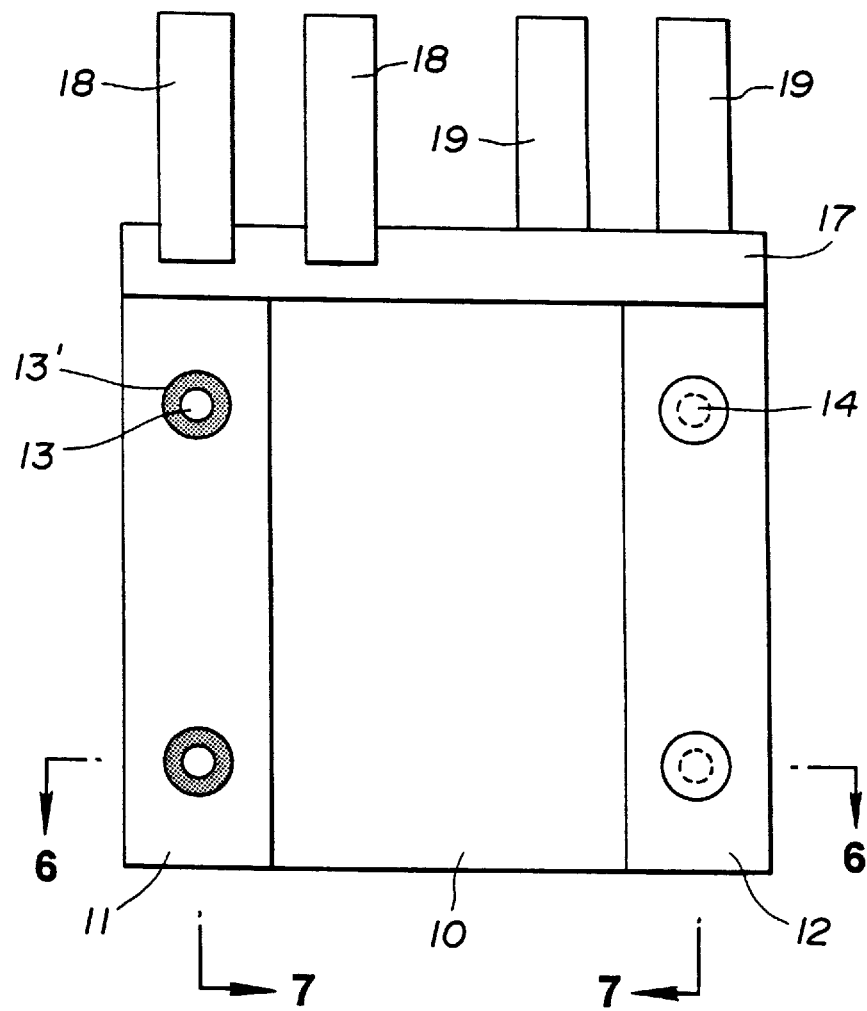
FIG. 5 is a front view showing an example of a single cell in the lithium ion secondary cell according to the present invention.
Figure 6:
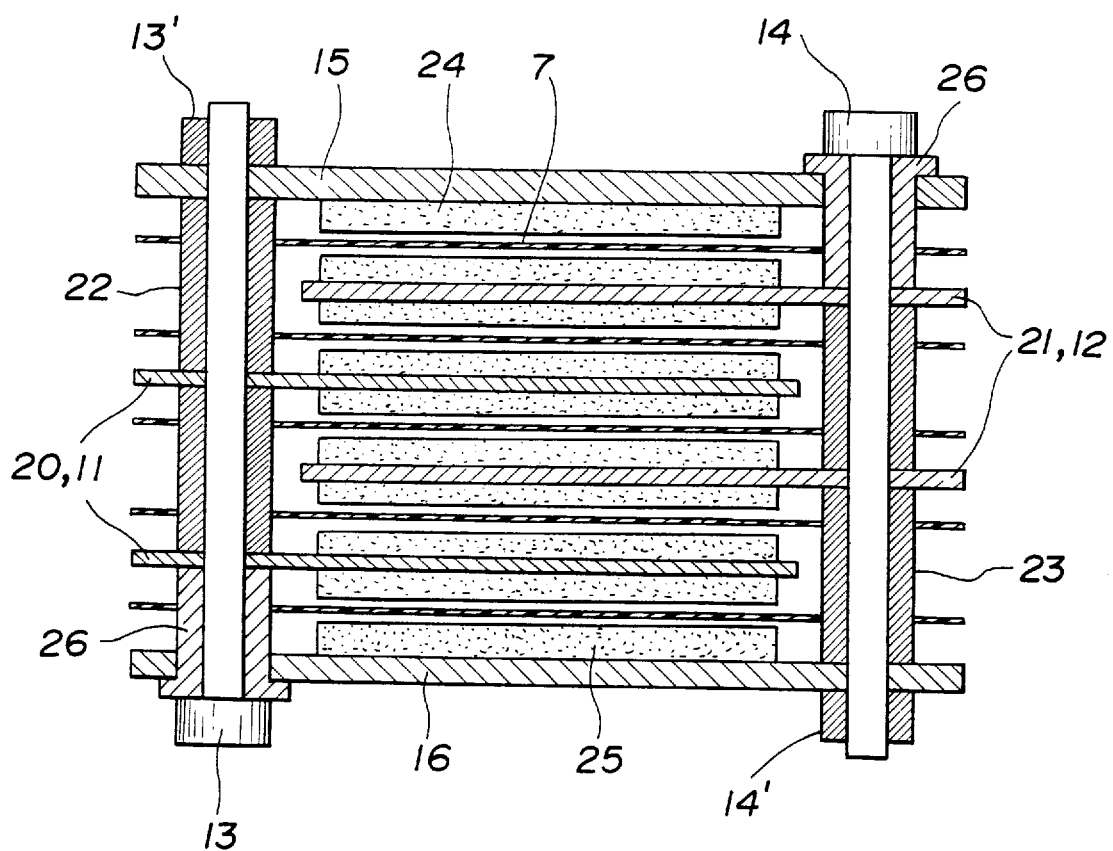
FIG. 6 is a plan view of the cell element taken along line 6—6 of FIG. 5.
Figure 7:
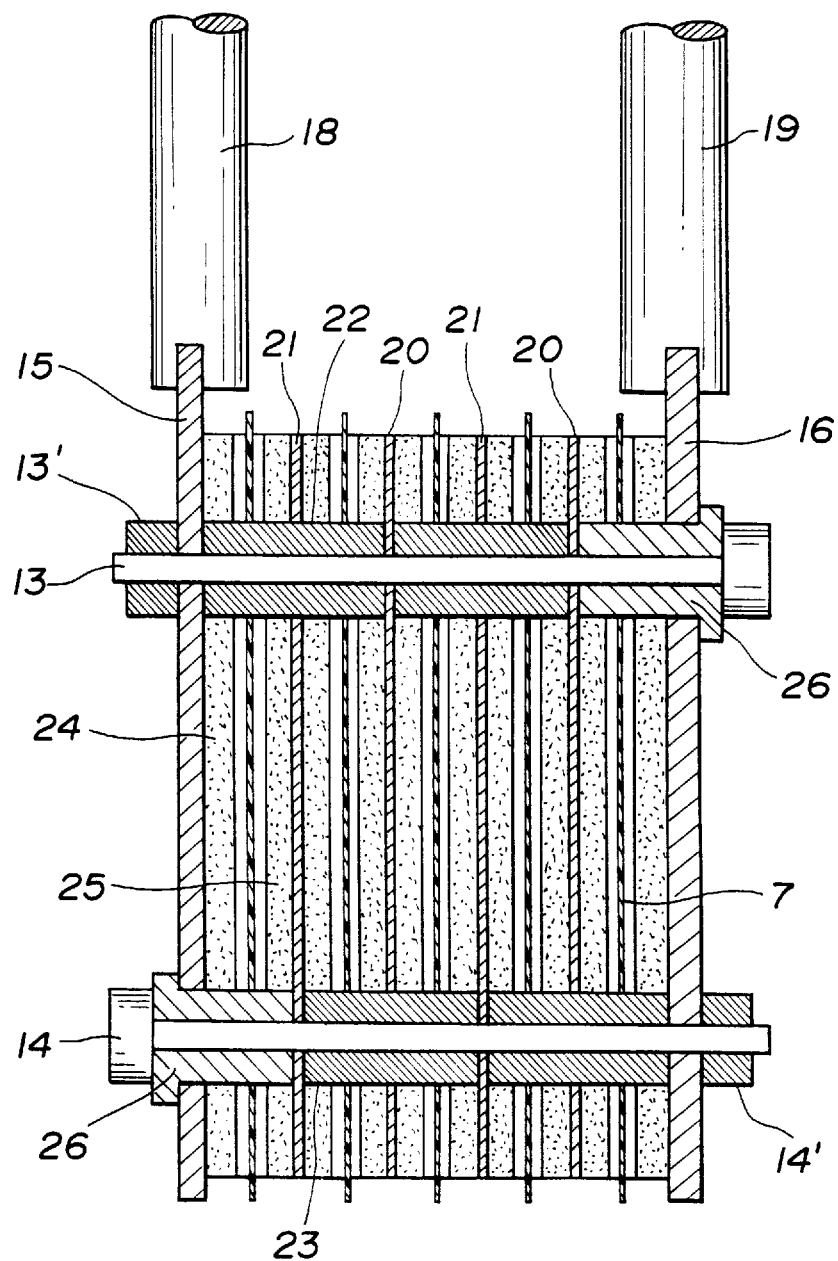
FIG. 7 is a side view of the cell element taken along line 7—7 of FIG. 5.

FIGS. 5–7 illustrate the single cells for a lithium ion secondary cell obtained in the manner described above. FIG. 5 is a frontal view, FIG. 6 is a plane view taken along the section 6—6 of FIG. 5, and FIG. 7 is a side view taken along the section 7—7 of FIG. 5.

In these figures, numeral 20 designates metal foils of the negative electrodes, 15 end metal foil of the negative electrode, 11 lugs of the metal foils of the negative electrodes, and 24 mixed agent (active substance) for the negative electrode. These elements combine to constitute the negative electrode. Numeral 21 designates metal foils of the positive electrodes, 16 end metal foil of the positive electrode, 12 lugs of the metal foils of the positive electrodes, and 25 mixed agent (active substance) for the positive electrode. These elements constitute the positive electrode. Numeral 10 indicates the area where the negative or positive electrode mixed agent is to be applied.

The end metal foil 15 of the negative electrode is coated on its one side alone with the negative electrode mixed agent 24. It has lugs on both sides thereof for securing the spacers of the positive electrodes in position, and is designed to have a thickness of 300 $\mu$m to allow welding thereto of the terminal metal piece. The end metal foil 16 of the positive electrode is coated on one side alone thereof with the positive electrode mixed agent 25 and has lugs on both sides thereof for securing the spacers of the negative plates. It has a thickness of 300 $\mu$m to allow welding thereto of the terminal metal piece. 17 indicates the zone where the terminal metal pieces are welded at the upper parts of the metal foils 15, 16. Numeral 18 refers to a negative electrode terminal (metal piece) of the single cell, 19 a positive electrode terminal (metal piece), 22 spacers for the negative electrodes, 23 spacers for the positive electrodes, 26 non-conductive spacers which concurrently serve as washers, 13 and 13' a bolt-and-nut combination for securing the negative electrodes, and 14 and 14' a bolt-and-nut combination for securing the positive electrodes. The lugs of the respective electrodes and the spacers are mechanically secured by these bolt-and-nut combinations. Numeral 7 designates separators.

<Construction of cell assembly>

10 single cells are packed in a polypropylene-made container having partition walls, and after supplying an electrolyte into the container, the top opening of the container is closed. In this state, it is noted that the terminals of the negative and positive electrodes of each cell protrude from the top cover of the container. Two terminals of the negative electrodes and two terminals of the positive electrodes per cell, that is, 40 terminals in all of the cells stick out from the container. These terminals are sealed by a proper sealant at the parts of the top cover where they project out, and then the container is closed. The terminals of the respective cells are connected in series by the terminal connectors, and a casing is fitted on the container.

The terminals of the positive and negative electrodes of the cell assembly are extended out of the cell case sidewise thereof. (They may be extended out from top of the cell case.) Air or water is supplied externally into the chamber housing the cell terminals to dissipate the heat generated in the cell.

Used as the electrolyte is a solution prepared by dissolving one mol/litre of lithium salt of phosphorus hexafluoride in a 1:1 mixture of propylene carbonate and dethoxyethane.

The charge and discharge capacity of this lithium ion secondary cell is 3,500 Wh, the cell voltage is 35 V and the energy density in the cell is 125 Wh/kg.

Figure 8:
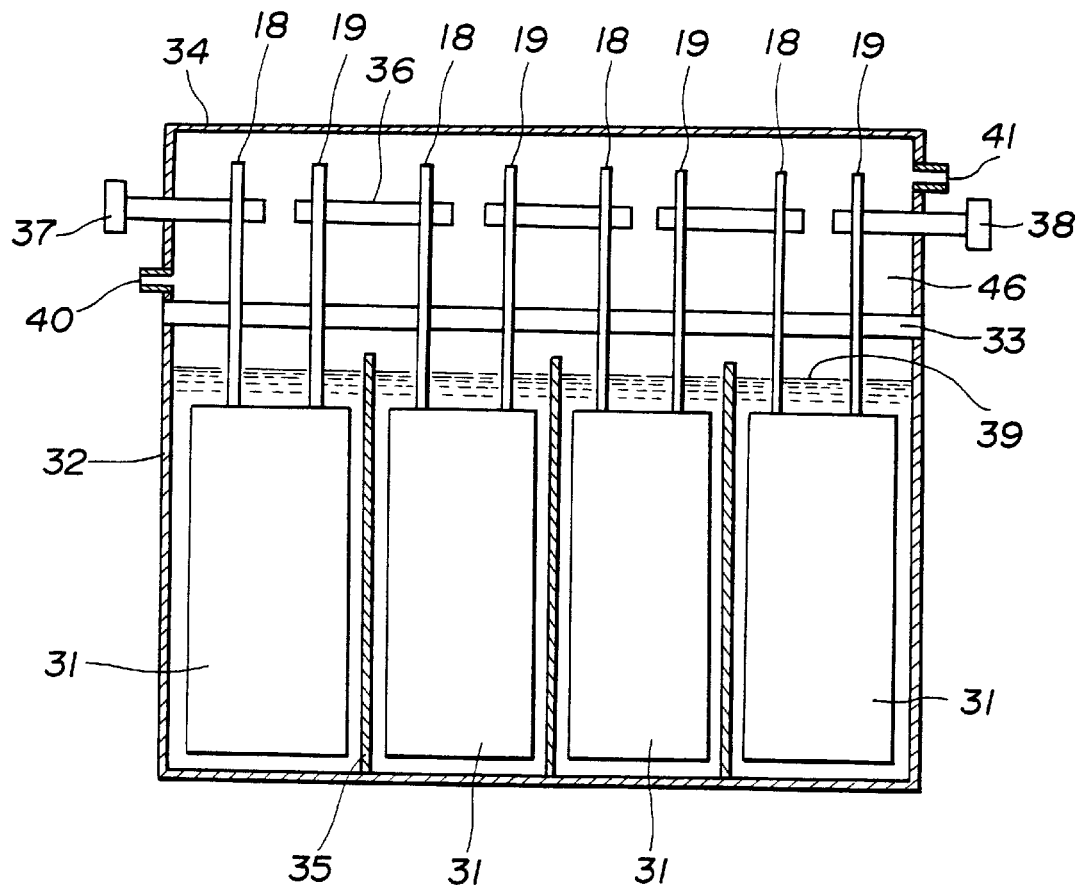
FIG. 8 is a front view showing an example of an assembled cell in the lithium ion secondary cell of the present invention.
Figure 9:
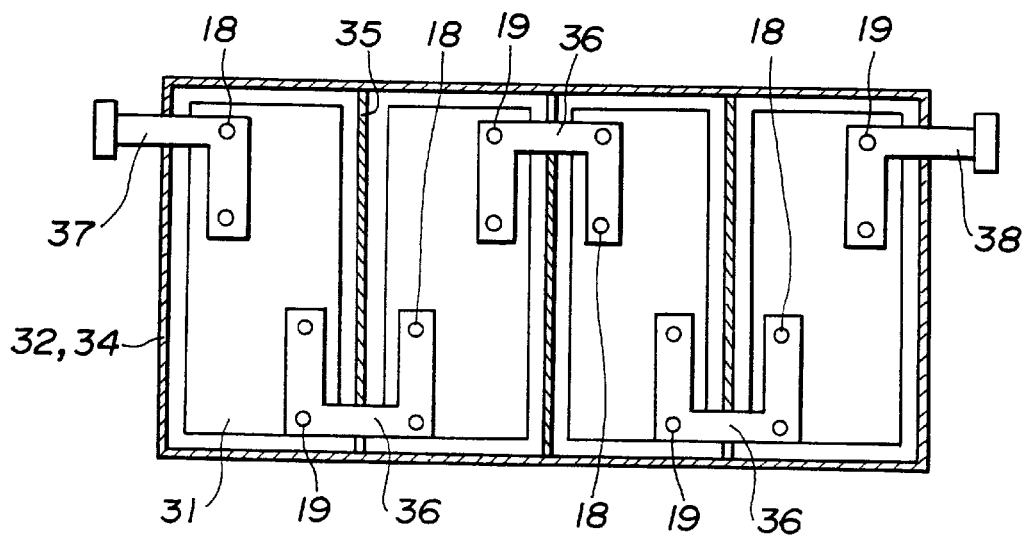
FIG. 9 is a plan view of the assembled cell of FIG. 8.
Figure 10:
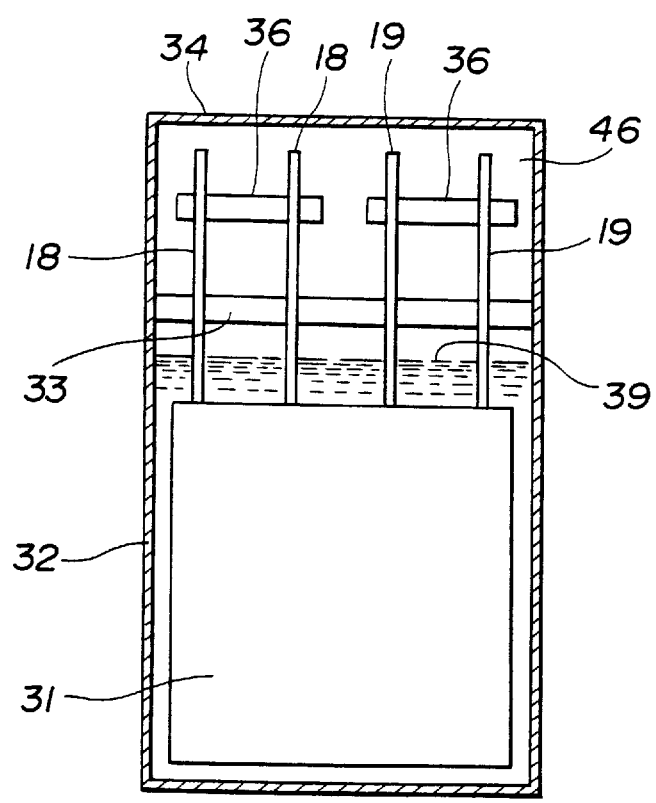
FIG. 10 is a side view of the assembled cell of FIG. 8.

FIGS. 8–10 illustrate the cell assembly in the lithium ion secondary cell obtained in the manner described above. FIG. 8 is a frontal view, FIG. 9 is a plan view, and FIG. 10 is a side elevation.

In these figures, numeral 31 designates single cells, 32 body of the cell case, 33 top cover of the cell case, 34 terminal cover of the cell case, and 35 partition walls of the interior of the cell case.

Also in the figures, numeral 18 indicates the negative electrode terminals of the single cells, 19 positive electrode terminals of the cells, 36 cell connectors, 37 anode terminal of the cell assembly, 38 cathode terminal of the cell assembly, 39 liquid level of the electrolyte, 46 terminal chamber of the cell, and 40 and 41 air or water inlets in the cell terminal chamber 46.

Single cell assemblage by a method different from the one described above is explained below.

<Construction of single cell>

The above-described negative and positive electrodes are assembled in layers alternately with 25 μm thick porous polypropylene sheets interposed therebetween as separators to construct a single cell. The electrodes at both ends have been coated on one side alone thereof with the respective electrode mixed agents. On the lugs of the negative electrodes on the left side are disposed the non-conductive spacers held between the negative electrodes. The non-conductive spacers are also provided in the similar way on the lugs of the positive electrodes on the right side. The spacers are provided at three locations in a longitudinally inserted manner on both negative electrode side and positive electrode side. In this case, in order to better workability, it is recommended to use the electrodes having the non-conductive spacers already adhered securely to the lugs.

The ends of the lugs of the copper foils of the negative electrodes are bound up in combinations of 6 to 7 pieces (3 pieces in the illustrations) and clamped by a pair of copper-made elongated plates (metal pieces), and the tips of the copper foil lug ends and the pair of copper-made elongated plates are TIG welded from the of the said lug end tips. Likewise, the ends of the lugs of the aluminum foils of the positive electrodes are bound up in combinations of 6 to 7 pieces and clamped by a pair of aluminum-made elongated plates (metal pieces), followed by TIG welding of the tips of the aluminum foil lug ends and the pair of aluminum-made elongated plates from the of the said lug end tips. There are made four sets (2 sets in the illustrations) of the welded metal foil and metal piece combinations for each of the positive and negative electrodes per single cell. Metal bars are welded to the metal pieces and connected in parallel separately for the respective negative electrode and positive electrode. In this way, there is formed a collector electrically connected to the positive and negative electrodes separately.

The single cell thus constructed is secured by a non-conductive frame in the direction where the cells are laminated.

There can thus be obtained a single cell to be used for a large-capacity lithium ion secondary cell with high toughness and high vibration and impact resistance.

By assembling 26 sets and a half of the electrodes ("half" because the electrodes at both ends are coated on one side alone with an electrode mixed agent) of this size, it is possible to obtain a single cell having a charge and discharge capacity of about 350 Wh.

Used as the terminals for taking out electric current and heat from the single cells are the metal bars welded to the metal pieces. In this case, there are provided 4 terminals (2 terminals being shown in the drawings) for each electrode per cell. These terminals project from the top cover of the cell container and four of them are connected in parallel above the top cover.

Figure 11:
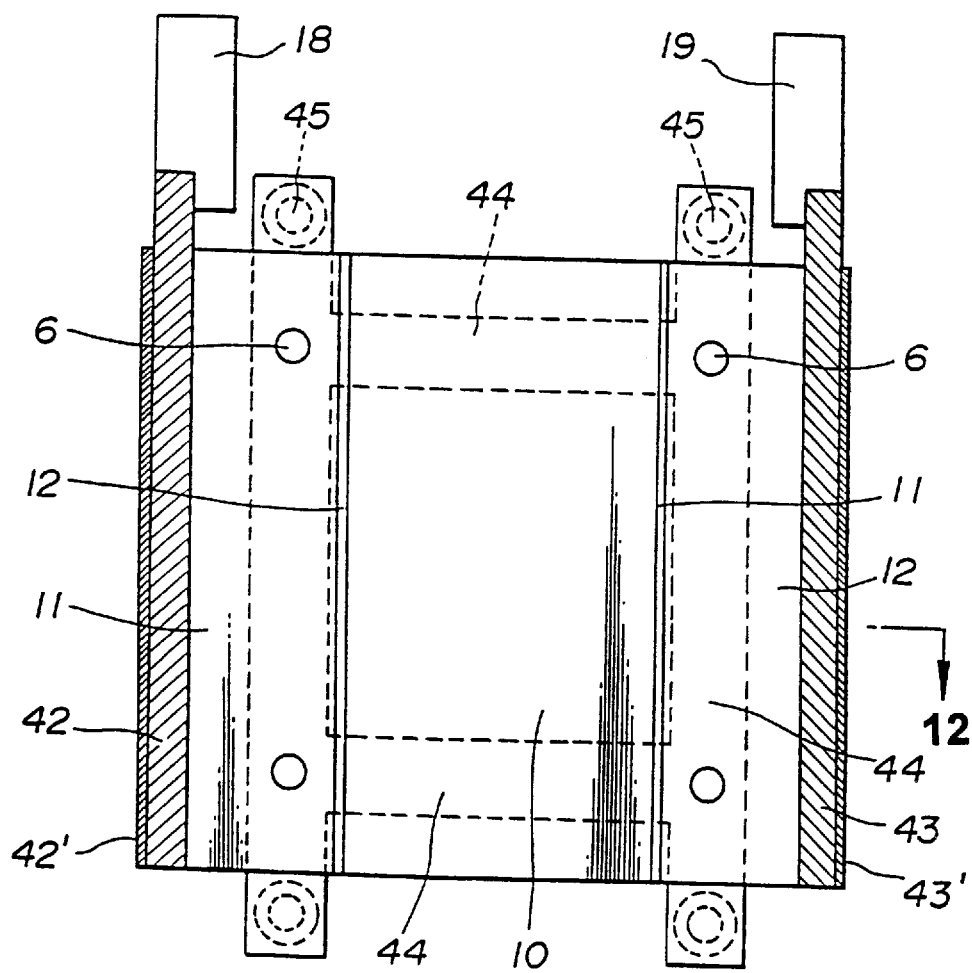
FIG. 11 is a front view showing an example of a single cell in a lithium ion cell according to the present invention, taken along line 11 of FIG. 12.
Figure 12:
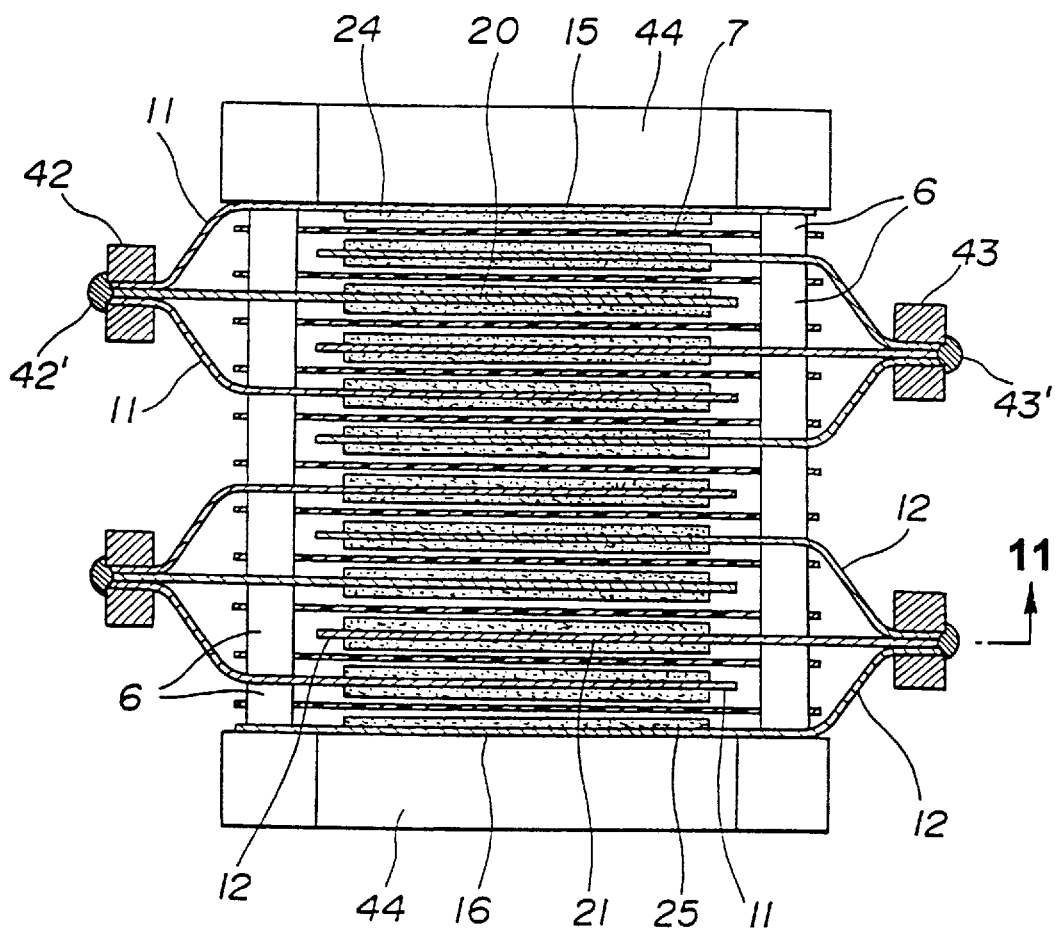
FIG. 12 is a plan view of the single cell of FIG. 5, taken along line 12 of FIG. 11.

FIGS. 11 and 12 show a single cell for a lithium ion secondary cell obtained in the manner described above. FIG. 11 is a frontal view taken along the section 11 of FIG. 12, and FIG. 12 is a plan view taken along the section 12 of FIG. 11.

In these figures, numeral 20 designates the metal foils of the negative electrodes, 15 end metal foil of the negative electrode, 11 lugs of the metal foils of the negative electrodes, and 24 mixed agent (composed of active substance and binder) for the negative electrode. These elements constitute the negative electrode. Numeral 21 designates the metal foils of the positive electrodes, 16 end metal foil of the positive electrode, 12 lugs of the metal foils of the positive electrodes, and 25 mixed agent (composed of active substance and binder) for the positive electrode. These elements constitute the positive electrode. Numeral 10 defines the area where the negative electrode mixed agent or the positive electrode mixed agent is to be applied.

The end metal foil 15 of the negative electrode is coated on one side alone thereof with the mixed agent 24 for the negative electrode and is dimensionally so designed as to allow securing thereto of the spacers of the positive electrodes. Likewise, the end metal oil 16 of the positive electrode is coated on one side alone thereof with the mixed agent 25 for the positive electrode and has a size suited for securing thereto of the spacers of the negative electrodes.

In FIGS. 11 and 12, numeral 42 designates metal pieces for the negative electrode, 42' weld portions of the said metal pieces 42 and the lugs 11 of the metal foils of the negative electrodes, 43 the metal pieces for the positive electrode, and 43' weld portions of the metal pieces 42 and the lugs 12 of the metal foils of the positive electrodes.

Numeral 6 refers to non-conductive spacers, 44 non-conductive securing frame, 45 securing bolts, and 7 separators.

Numeral 18 indicates the terminals of the negative electrodes of the cells, and 19 the terminals of the positive electrodes of the cells.

By using these single cells, it is possible to make a cell assembly for a secondary cell in the same way as described above.

What is claimed is:

1. A lithium ion secondary cell comprising a plurality of single cells composed of a collector comprising:

positive electrodes composed of a metallic material coated with a positive electrode active substance;

negative electrodes composed of a metallic material coated with a negative electrode active substance;

separators interposed between said positive and negative electrodes;

lugs of said metallic materials where said active substance is not coated; and conductors adapted to bunch and clamp said lugs of each of the positive and negative electrodes, said positive and negative electrodes being assembled in laminate alternately, and said lugs of the positive and negative electrodes being welded at their ends the respective conductors separately so that electric current can be taken out through said conductors.

2. A lithium ion secondary cell according to claim 1, wherein the welding of the lugs of the electrodes and the conductors is accomplished by a tungsten-inert gas welding, high frequency welding or ultrasonic welding.

3. A lithium ion secondary cell according to claim 1, further comprising the spacers for regulating the spacing between the electrodes, the spacers disposed between the lugs of the metallic materials of the electrodes in assemblage of a single cell.

4. A lithium ion secondary cell according to claim 3, wherein the spacers are previously adhered to the lugs of the metallic materials.

5. A lithium ion secondary cell according to claim 1, further comprising an assembly of series-connected single cells, wherein the conductors electrically and thermally connected to the collectors are so arranged that at least one conductor per cell for each electrode is extended directly from each single cell, to the outside of an inner cell container through an wall thereof so that electric current can be taken out through said conductors while allowing release of heat accumulated in the cell during charge and discharge, thereby preventing a rise in temperature in the cell.

6. A li thium ion secondary c ell according to claim 5, wherein a coolant is i ntroduced into a chamber where the terminals of the single cells composed of a conductor are covered by a terminal cover, said coolant removing the heat from said terminals.

7. A lithium ion secondary cell comprising a plurality of single cells composed of a collector comprising:

positive electrodes composed of a metallic material coated with a positive electrode active substance;

negative electrodes composed of a metallic material coated with a negative electrode active substance;

separators interposed between said positive and negative electrodes;

lugs of said metallic materials where said active substance is not coated;

conductors electrically connected to said lugs of each of the positive and negative electrodes; and conductive spacers disposed between said lugs of each of the positive and negative electrodes for maintaining constant spacing between each of the positive and negative electrodes, said positive and negative electrodes being assembled in laminate alternately, and the spacers disposed between the lugs of the positive electrodes and the spacers disposed between the lugs of the negative electrodes being secured in position to electrically connect the electrodes of the single cells so that electric current may be taken out through said spacers.

8. A lithium ion secondary cell according to claim 7, wherein the electrodes at both ends of the single cell are dimensionally so designed that the lugs of the metallic materials of the positive and negative electrodes are rested on the spacers of both positive and negative electrodes, and the spacers are secured in position in such a manner that at each end of the negative electrode, the lugs thereof are electrically insulated from the other lugs of the positive electrodes and at each end of the positive electrode, the lugs thereof are electrically insulated from other lugs of the negative electrodes.

9. A lithium ion secondary cell according to claim 7, wherein the securing of the spacers is accomplished by forming openings in the corresponding parts of the spacers and the lugs of the metallic materials of the electrodes, and passing bolts or threaded metal bars through said openings and tightening them with nuts.

10. A lithium ion secondary cell according to claim 7 wherein the conductive spacers are previously adhered to the lugs of the metallic materials of the positive and negative electrodes with a conductive adhesive.

11. A lithium ion secondary cell according to claim 7, wherein at least one of the metallic materials of the positive and negative electrodes has not less than 100 $\mu$m in thickness, and electric current is taken out through the conductors welded thereto.

12. A lithium ion secondary cell according to claim 7, further comprising an assembly of series-connected single cells, wherein the conductors electrically and thermally connected to the collectors are so arranged that at least one conductor per cell for each electrode is extended directly from each cell, to the outside of an inner cell container through a wall thereof so that electric current can be taken out through said conductors while allowing release of heat accumulated in the cell during charge and discharge, thereby preventing a rise of temperature in the cell.

13. A lithium ion secondary cell according to claim 12, wherein a coolant is introduced into a chamber where the terminals of the single cells composed of a conductor are covered by a terminal cover, said coolant removing the heat from said bunches of the terminals.

14. A lithium ion secondary cell comprising an assembly of series-connected single cells each comprising a collector comprising:

positive electrodes composed of a metallic material coated with a positive electrode active substance;

negative electrodes composed of a metallic material coated with a negative electrode active substance;

separators disposed between said positive and negative electrodes;

lugs of said metallic materials where said active material is not coated; and conductors connected separately to said lugs of the positive and negative electrodes, the conductors electrically and thermally connected to said collectors being so arranged that at least one conductor per cell for each electrode is extended directly from each cell, to the outside of a cell container through a wall thereof so that electric current can be taken out through said conductors while allowing release therethrough of the heat accumulated in the cell during charge and discharge, thereby preventing a rise of temperature in the cell.

* * * * *